US012637963B1

(12) United States Patent
Gnitzcavich et al.

(10) Patent No.: US 12,637,963 B1
(45) Date of Patent: May 26, 2026

(54) MAINTAINABLE DESIGN FOR BEARING COMPARTMENT SERVICE LINE INCORPORATING A GROOVED END

(71) Applicant: RTX CORPORATION, Farmington, CT (US)

(72) Inventors: Nicholas Daniel Gnitzcavich, Harwinton, CT (US); Thomas B. Avis, Manchester, CT (US); Krzysztof Tutka, Rzeszów (PL); Aleksander Niemiec, Rzeszów (PL); Sebastian Majewski, Rzeszów (PL)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/098,382

(22) Filed: Apr. 2, 2025

(51) Int. Cl.
*F01D 25/20* (2006.01)
*F01D 25/16* (2006.01)

(52) U.S. Cl.
CPC ........... *F01D 25/20* (2013.01); *F01D 25/162* (2013.01); *F05D 2230/60* (2013.01); *F05D 2260/98* (2013.01)

(58) Field of Classification Search
CPC .... F01D 25/20; F01D 25/162; F05D 2230/60; F05D 2260/98
See application file for complete search history.

(56) References Cited

U.S. PATENT DOCUMENTS

| | | | | |
|---|---|---|---|---|
| 4,765,145 | A | 8/1988 | Hines | |
| 9,683,690 | B2 * | 6/2017 | Lefebvre | F16L 25/06 |
| 9,726,030 | B2 | 8/2017 | Feaver et al. | |
| 11,702,946 | B1 * | 7/2023 | Lefebvre | F01D 25/162 415/110 |
| 2013/0308737 | A1 * | 11/2013 | Andre | G21C 15/22 403/53 |
| 2014/0003920 | A1 * | 1/2014 | Scott | F01D 9/065 415/177 |
| 2018/0066781 | A1 * | 3/2018 | Sanchez | F01D 25/183 |
| 2018/0128121 | A1 * | 5/2018 | Avis | F01D 9/065 |
| 2018/0128122 | A1 * | 5/2018 | Avis | F01D 25/32 |
| 2020/0256213 | A1 * | 8/2020 | Troughton | F01D 9/065 |
| 2020/0332921 | A1 * | 10/2020 | Marshall | F01D 9/065 |

* cited by examiner

*Primary Examiner* — Aaron R Eastman
(74) *Attorney, Agent, or Firm* — Carlson, Gaskey & Olds, P.C.

(57) ABSTRACT

A gas turbine engine includes a compressor section and a turbine section. The turbine section includes a static housing defining a bearing compartment, and the bearing compartment includes at least one bearing. A lubricant seal assembly is adjacent to the static housing to bound the bearing compartment. A tube is routed through the static housing and is configured to convey fluid. The tube includes a first end and a second end. The first end includes a grooved neck which includes an annular body with an inner circumferential surface and an outer circumferential surface surrounding the inner circumferential surface. The outer circumferential surface includes a plurality of longitudinal grooves. The second end is threaded into the static housing. A lubrication system supplies lubricant to the bearing compartment and a shaft is supported by the at least one bearing. A method is also disclosed.

17 Claims, 7 Drawing Sheets

MAINTAINABLE DESIGN FOR BEARING COMPARTMENT SERVICE LINE INCORPORATING A GROOVED END

BACKGROUND OF THE INVENTION

This application relates to the use of a collar, a retention plate and a tube with a grooved neck, which enable maintenance to be carried out on the tube.

Gas turbine engines typically include a fan delivering air into a bypass duct as propulsion air, and into a core engine. The core engine air moves into a compressor section where it is compressed and delivered into a combustor. The air is mixed with fuel and ignited in the combustor and passed downstream over turbine rotors driving them to rotate. The turbine rotors in turn rotate the fan and compressor rotors.

Bearing compartments typically receive fluid for cooling and lubricating one or more bearings. The bearing compartment may include one or more seals that fluidly separate the bearing compartment from an adjacent portion of the engine.

Drainage tubes are used to detect leakage lubricant from bearing compartments. These drainage tubes are exposed to dynamic forces, including vibrations and thermal expansion, which can cause them to shift relative to their surrounding structures. Replacing such tubes can be challenging.

SUMMARY OF THE INVENTION

In a featured embodiment, a gas turbine engine includes a compressor section and a turbine section. The turbine section includes a static housing defining a bearing compartment, and the bearing compartment includes at least one bearing. A lubricant seal assembly is adjacent to the static housing to bound the bearing compartment. A tube is routed through the static housing and is configured to convey fluid. The tube includes a first end and a second end. The first end includes a grooved neck which includes an annular body with an inner circumferential surface and an outer circumferential surface surrounding the inner circumferential surface. The outer circumferential surface includes a plurality of longitudinal grooves. The second end is threaded into the static housing. A lubrication system supplies lubricant to the bearing compartment and a shaft is supported by the at least one bearing.

In another embodiment according to the previous embodiment, the tube is positioned on an opposite side of the lubricant seal assembly from the at least one bearing.

In another embodiment according to any of the previous embodiments, the tube is configured to convey fluid away from the second end to the first end.

In another embodiment according to any of the previous embodiments, the bearing compartment is in a mid turbine section positioned between a high pressure turbine and a low pressure turbine, and the static housing forms part of a mid turbine frame.

In another embodiment according to any of the previous embodiments, wherein the lubrication system includes an oil tank, an oil pump configured to pump the fluid to the bearing compartment, and a scavenge pump configured to pump fluid to the oil tank.

In another embodiment according to any of the previous embodiments, a collar includes an aperture and first and second slots extending through a body of the collar from a first surface of the collar to a second surface of the collar. The aperture is configured to receive the first end of the tube therethrough and the aperture includes an engagement surface to engage the first end of tube. A retention plate includes first, second and third bores extending through a body of the retention plate from a first surface of the retention plate to a second surface of the retention plate. The first bore is configured to receive the first end of the tube.

In another embodiment according to any of the previous embodiments, the collar is positioned on the static housing and the retention plate is positioned over the collar such that the first surface of the collar abuts the static housing and the first surface of the retention plate abuts the second surface of the collar.

In another embodiment according to any of the previous embodiments, the aperture, first slot, and second slot align with the first, second and third bores, respectively, and the first slot and second bore are configured to receive a bolt therethrough, and the second slot and third bore are configured to receive a bolt therethrough.

In another embodiment according to any of the previous embodiments, the retention plate includes a pin extending outward from the first surface of the retention plate, and the collar includes a third slot extending at least partially through the body of the collar from the second surface of the collar. The third slot is configured to receive the pin.

In another embodiment according to any of the previous embodiments, the first and second slots are positioned at opposite sides of the aperture and are an elongated, crescent shape with curved opposing ends to allow adjustment.

In another embodiment according to any of the previous embodiments, the bearing compartment is in a mid turbine section positioned between a high pressure turbine and a low pressure turbine, and the static housing forms part of a mid turbine frame.

In another embodiment according to any of the previous embodiments, a collar includes an aperture and first and second slots extending through a body of the collar from a first surface of the collar to a second surface of the collar. The aperture is configured to receive the first end of the tube therethrough and includes an engagement surface to engage the first end of tube. A retention plate includes first, second and third bores extending through a body of the retention plate from a first surface of the retention plate to a second surface of the retention plate. The first bore is configured to receive the first end of the tube.

In another embodiment according to any of the previous embodiments, the collar is positioned on the static housing and the retention plate is positioned over the collar such that the first surface of the collar abuts the static housing and the first surface of the retention plate abuts the second surface of the collar.

In another embodiment according to any of the previous embodiments, the aperture, first slot, and second slot align with the first, second and third bores, respectively, and the first slot and second bore are configured to receive a bolt therethrough, and the second slot and third bore are configured to receive a bolt therethrough.

In another embodiment according to any of the previous embodiments, the retention plate includes a pin extending outward from the first surface of the retention plate, and the collar includes a third slot configured to receive the pin.

In another featured embodiment, a method of installing a tube within a static housing of a mid-turbine frame of a gas turbine engine includes the steps of: inserting a second end of the tube into a cavity of the static housing such that threads of the second end engage a complementary surface along walls of the cavity; applying rotational torque to a grooved neck at a first end of the tube, opposite the second end, the grooved neck including a plurality of grooves on an outer circumferential surface of the grooved neck, to advance the second end along the complementary surface and draw the tube into the cavity until the tube reaches a seated position within the cavity; installing a collar over the first end of the tube; installing a retention plate on the collar; and bolting the retention plate and collar to the static housing to prevent rotation of the tube relative to the static housing.

In another embodiment according to any of the previous embodiments, the collar includes an aperture and first and second slots extending through a body of the collar from a first surface of the collar to a second surface of the collar. The retention plate includes first, second and third bores extending through a body of the retention plate from a first surface of the retention plate to a second surface of the retention plate.

In another embodiment according to any of the previous embodiments, the step of installing the collar over the first end of the tube further includes positioning the collar on the static housing such that the first surface of the collar abuts the static housing, the aperture receives the first end of the tube therethrough and an engagement surface of the aperture engages the first end of the tube. The step of installing the retention plate on the collar includes positioning the retention plate on the collar such that the first surface of the retention plate abuts the second surface of the collar, and the aperture, first slot, and second slot align with the first, second and third bores of the retention plate, respectively, and the first bore receives the first end of the tube partially therethrough.

In another embodiment according to any of the previous embodiments, the step of bolting the retention plate and collar to the static housing further includes driving a first bolt through the second bore and first slot into the static housing, and driving a second bolt through the third bore and second slot into the static housing.

In another embodiment according to any of the previous embodiments, the retention plate includes a pin extending outward from the first surface of the retention plate, and the collar includes a third slot configured to receive the pin.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
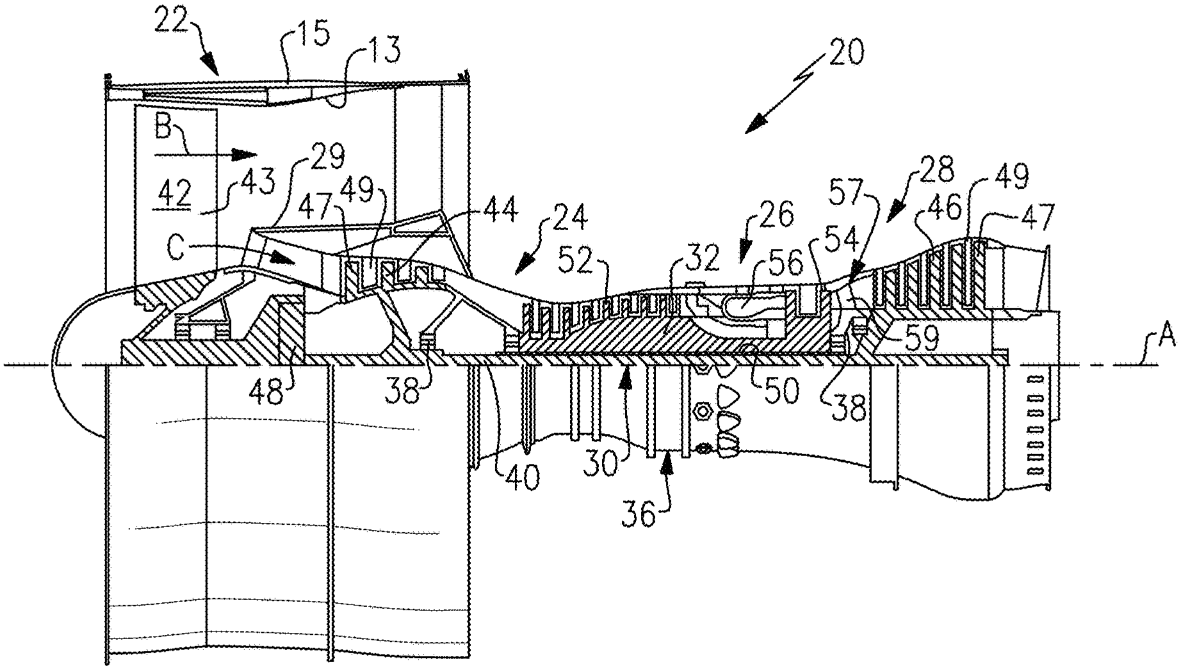
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ° \text{ R})/(518.7° \text{ R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
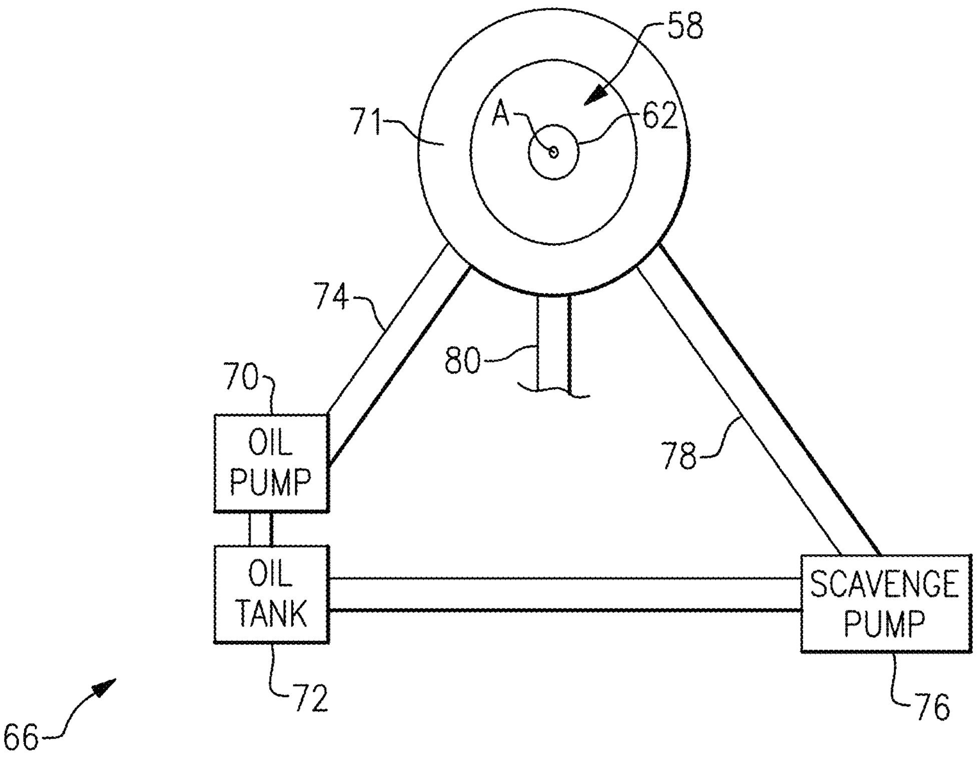
FIG. 2A schematically shows a layout view, along engine central longitudinal axis A, of a portion of a turbine section including a bearing compartment.
Figure 2B:
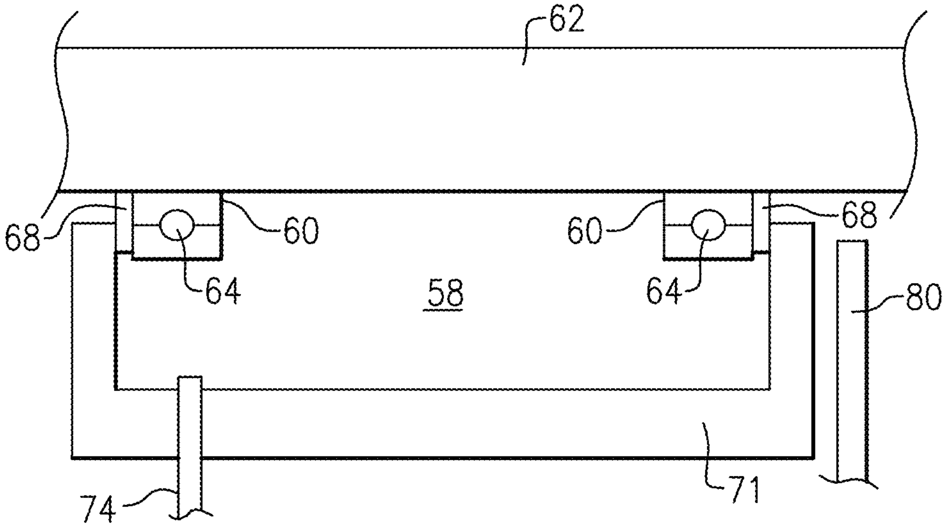
FIG. 2B schematically shows a side cross-sectional view of the turbine section of FIG. 2A.

FIGS. 2A and 2B schematically illustrate a portion of the turbine section 28, including a static housing 71 defining a bearing compartment 58. Bearings 60 support rotation of a rotatable shaft 62. The portion of the turbine section 28 may be within a frame which may include multiple bearing compartments 58. An outer carrier of the bearings 60 may be secured to a portion of the static housing 71 (which may be part of the static structure 36).

The bearings 60 may also include a rotatable member coupled to or integrally formed with the rotatable shaft 62. The rotatable shaft 62 may be one of the shafts of the engine 20, such as the shafts 40, 50. The rotatable shaft 62 may interconnect a compressor 44 or 52 and a turbine 46 or 54 that may drive the compressor 44 or 52, respectively. The bearings 60 include a ball 64 that supports the shaft 62.

The bearing compartment 58 may be adapted to receive lubricant to lubricate the bearings 60 and/or provide cooling augmentation during operation of the engine 20. FIGS. 2A and 2B also depict a lubrication system 66 and a seal assembly 68 for a gas turbine engine, such as the gas turbine engine 20 shown in FIG. 1.

In the implementation of FIGS. 2A and 2B, the seal assembly 68 seals a portion (e.g., perimeter) of the bearing compartment 58 of one of the rotatable shafts 62 to prevent a leakage of lubricant from the bearing compartment 58. The lubrication system 66 supplies lubricant to the bearings 60, and into the bearing compartment 58.

The lubrication system 66 includes a supply pump 70 for delivering lubricant from a tank 72 into an oil supply tube 74, when the engine 20 is operating, for communicating the lubricant into the bearing compartment 58. A scavenge pump 76 delivers lubricant from a location downstream of the bearing compartment 58 to the tank 72 via a return line 78. While the lubrication system 66 may provide lubrication to a bearing compartment 58 in the mid-turbine frame 57, a similar system could be utilized for providing lubrication to other locations within the engine 20.

A drainage tube 80 is positioned at an opposite side of the seal assembly 68 from the bearings 60. The tube 80 is a conduit that communicates oil from outside the bearing compartment 58 to a downstream location. If lubricant reaches the tube 80 this is an indication the seal assembly 68 may be leaking.

Figure 3A:
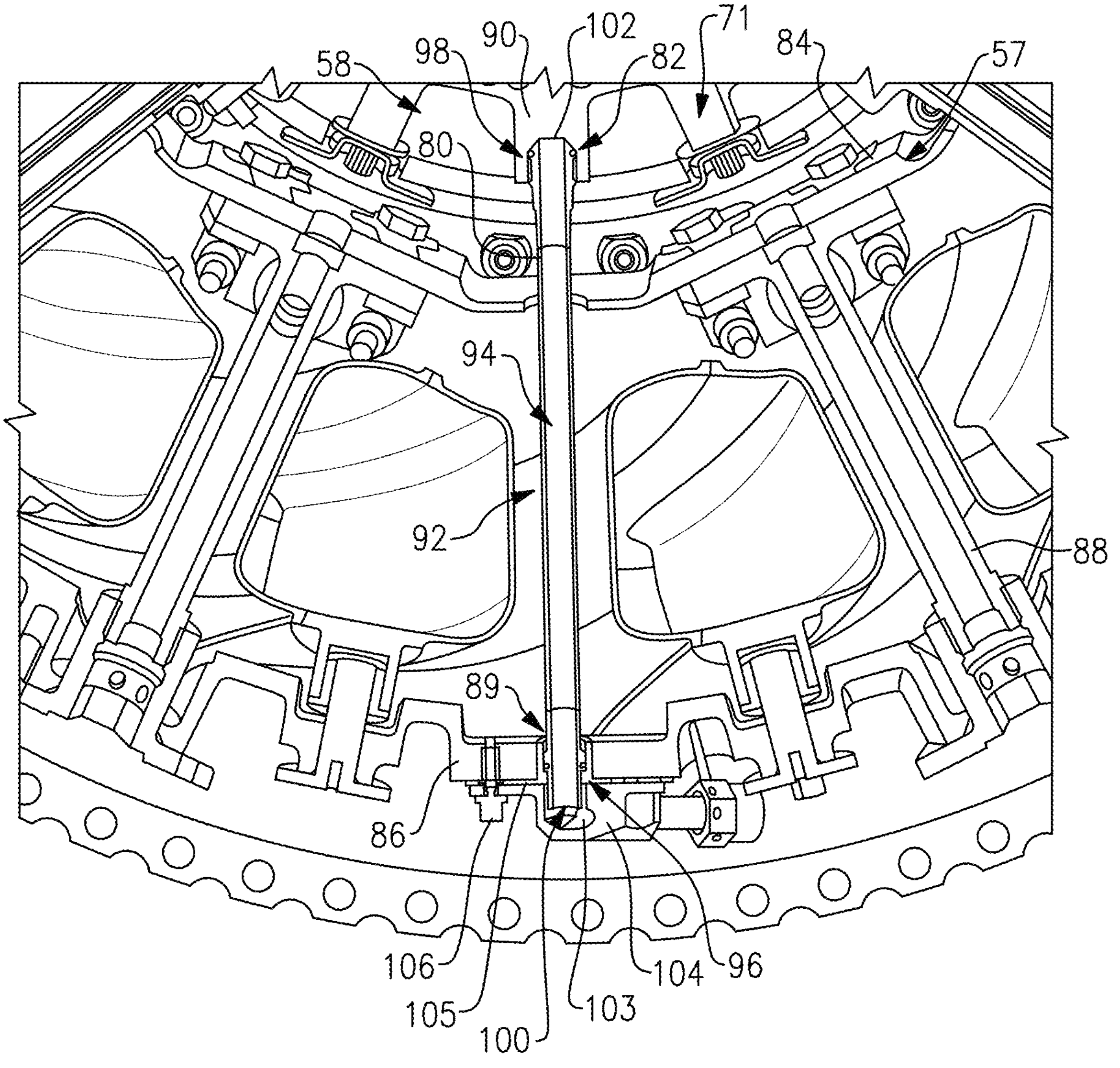
FIG. 3A shows a cross-sectional view of the turbine section of FIG. 2A along an engine central longitudinal axis.
Figure 3B:
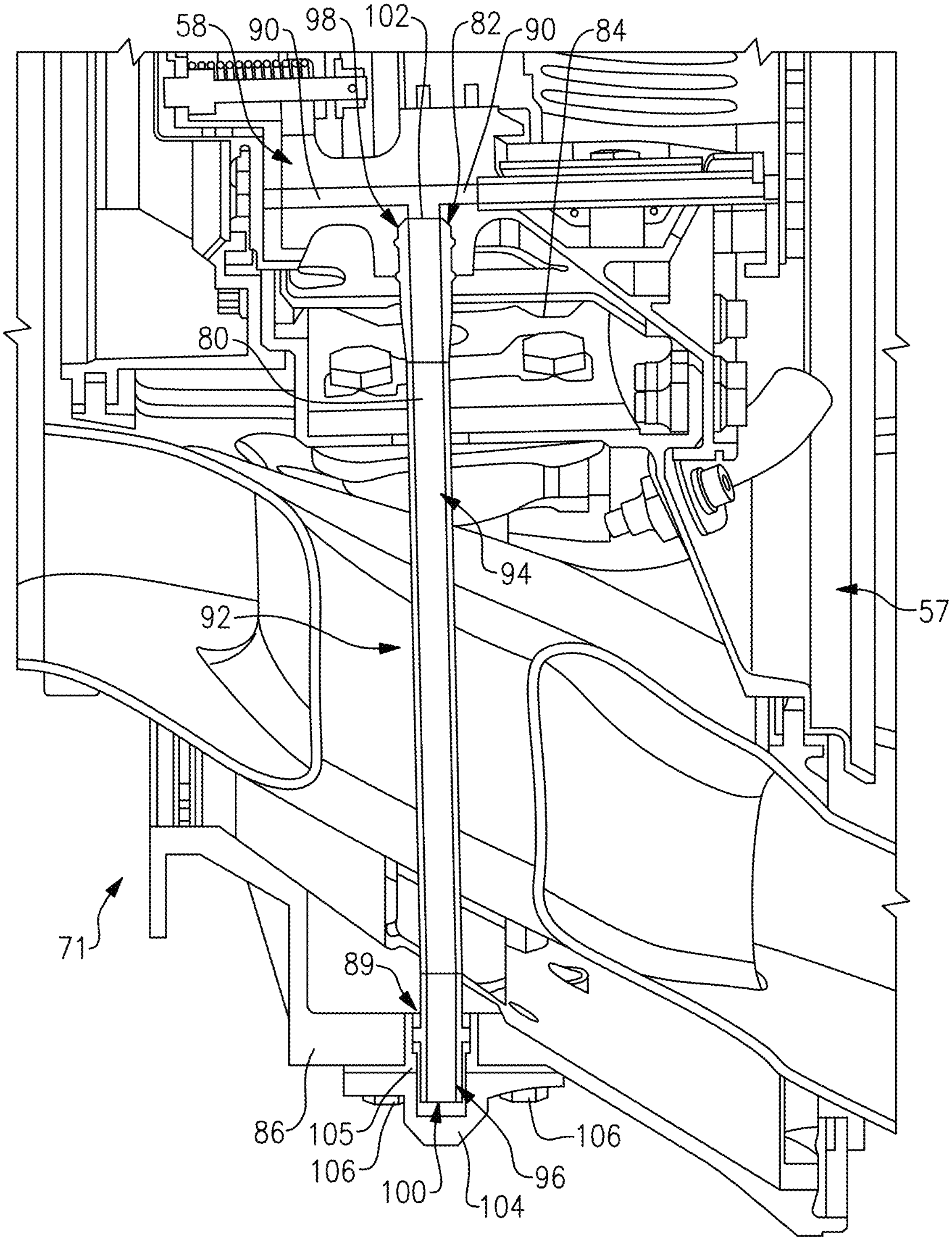
FIG. 3B shows a cross-sectional view of the turbine section of FIG. 2A perpendicular to an engine central longitudinal axis.

Referring to FIGS. 3A and 3B, the tube 80 is positioned within a cavity 82 of the static housing 71 forming part of the mid turbine frame 57. The mid turbine frame 57 is located generally between the high pressure turbine 54 and low pressure turbine 46 of the engine 20. The mid-turbine frame 57 generally includes an inner case 84, outer case 86, and spokes 88. The inner case 84 circumferentially surrounds the rotatable shaft 62 and the outer case 86 circumferentially surrounds the inner case 84. The spokes 88 are mechanically fastened at one end to the inner case 84, extending radially outward from the inner case 84, and are mechanically fastened to the outer case 86 at the opposite end. The spokes 88 maintain alignment of the mid-turbine frame 57 and help distribute the mechanical load from the gas flow and rotational forces from the shafts 40, 50. One or more discharge lines 90 communicate lubricant from the bearing compartment 58 to the tube 80.

The cavity 82 is shown to be located within the inner case 84, and the tube 80 extends from the cavity 82 to the outer case 86, and through an opening 89 in the outer case 86. The tube 80 includes an elongated body 92 forming an internal passage 94 therein. The body 92 has a first end 96 and a second end 98 and, when seated (e.g., completely threaded into the cavity 82), the body 92 is oriented to extend radially outward from the central longitudinal axis A of the engine 20 between the second end 98 and the first end 96. The second end 98 is received by the cavity 82 and the first end 96 of the tube 80 is received through the opening 89 in the outer case 86.

The first and second ends 96, 98 of the tube 80 include first and second ports 100, 102, respectively, that open to the internal passage 94. The second port 102 opens to one or more discharge lines 90 that communicate lubricant from outside the bearing compartment 58 to the tube 80. The first port 100 opens to a chamber 103 within a retention plate 104 that directs lubricant exiting the first port 100 to a downstream location.

In one implementation, the downstream location may be a turbine exhaust casing. Lubricant accumulating in the turbine exhaust casing may serve as an indication to an operator that a seal assembly 68 has been compromised and lubricant is leaking from the bearing compartment 58.

The retention plate 104 is stacked on top of a collar 105 such that it is positioned over the collar 105 and the first end 96 of the tube 80. The collar 105 is positioned between the outer case 86 and plate 104. The collar 105 extends into the opening 89 and is adapted to receive the first end 96 of the tube 80 therethrough and engage the first end 96 of the tube 80, described in greater detail below. The retention plate 104 and collar 105 are fastened to the outer case 86 with bolts 106 and together, the plate 104 and collar 105 prevent the tube 80 from rotating within the cavity 82 or from otherwise becoming unseated from the cavity 82, described in greater detail below.

The collar 105 prevents the tube 80 from rotating within the cavity 82 or from otherwise becoming unseated from the cavity 82.

Figure 3C:
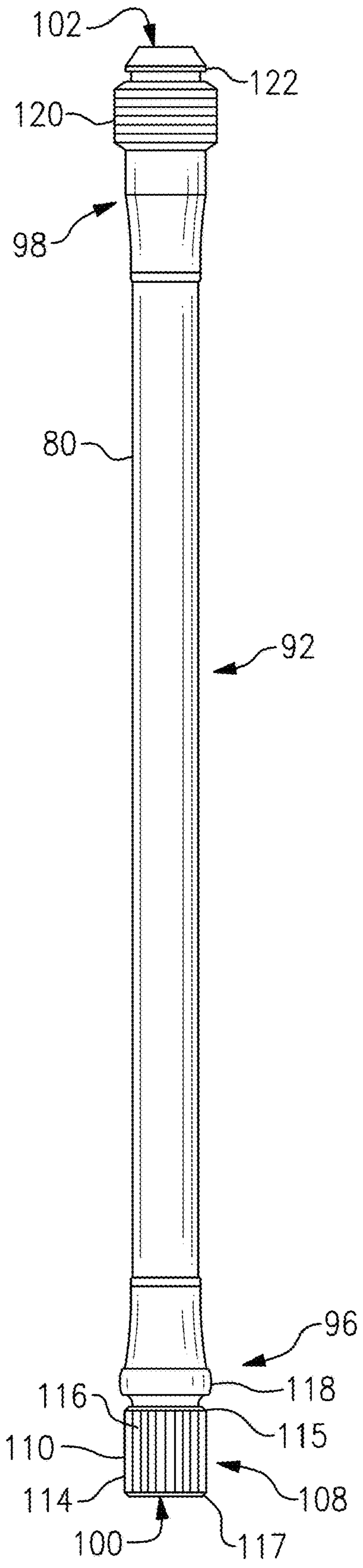
FIG. 3C shows a front view of a tube.

Referring to FIG. 3C, the first end 96 of the tube 80 includes a grooved neck 108. The grooved neck 108 has an annular body 110 including an inner circumferential surface 112 (see FIG. 4) and an outer circumferential surface 114 surrounding the inner circumferential surface 112. Grooves 116 are recessed into the outer circumferential surface 114, extending parallel to a central longitudinal axis of the tube 80 between a first edge 115 and second edge 117 of the grooved neck 108.

In an implementation, the grooves 116 are equidistantly spaced around a circumference of the outer circumferential surface 114 and there are twelve grooves 116.

The grooves 116 allow an operator performing maintenance on the tube 80 located in tight access areas to easily remove or install the tube 80 using standard tools, such as a socket wrench. The first end 96 of the tube 80 includes a tapered, protruding portion 118, encircling the tube's 80 circumference, that extends radially a set distance out from the grooved neck 108 and body 92. The protruding portion 118 acts as a physical stop and prevents the tube 80 from becoming unseated and sliding through the collar 105, as described further below.

The second end 98 of the tube 80 includes a threaded portion 120 and a conical seal 122 to prevent leakage between the discharge line 90 and the tube 80. The conical seal 122 creates a formed fit with walls of the cavity 82. The threaded portion 120 is adapted to engage a complementary surface along walls of the cavity 82, such as grooves.

Figure 4:
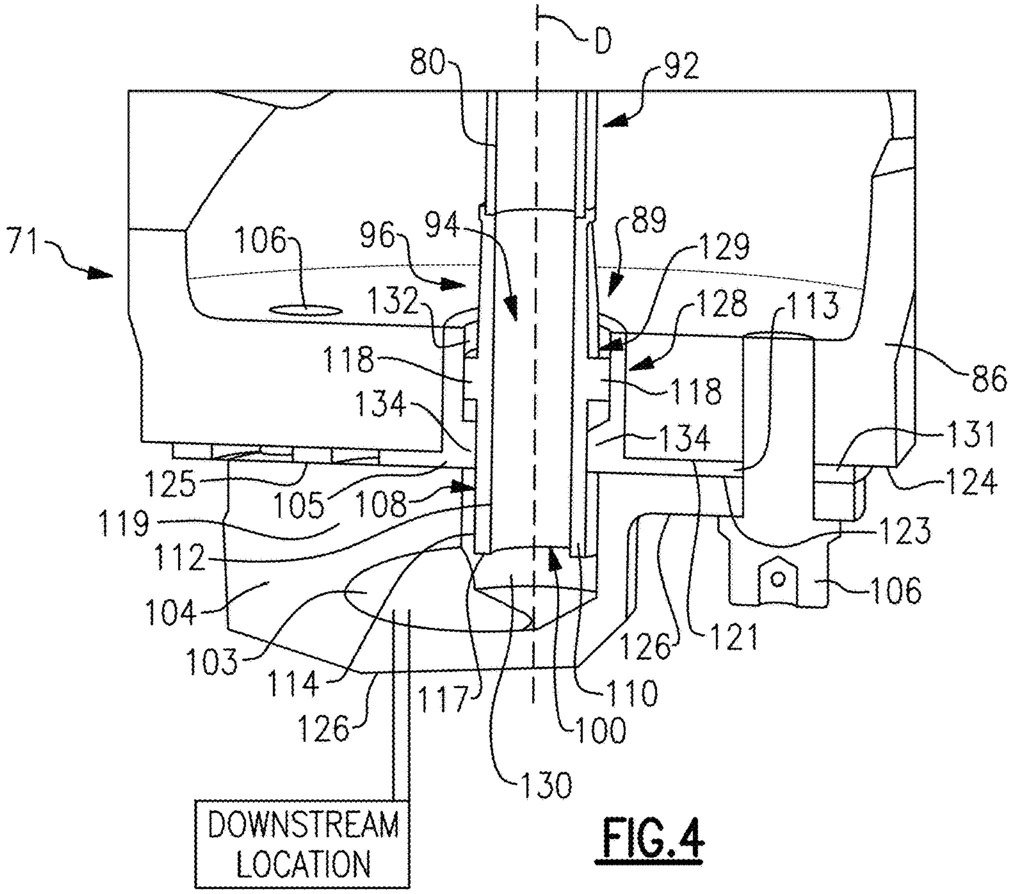
FIG. 4 schematically shows a side, cross-sectional view of a collar and retention plate placed over a first end of the tube of FIG. 3C.
Figure 6:
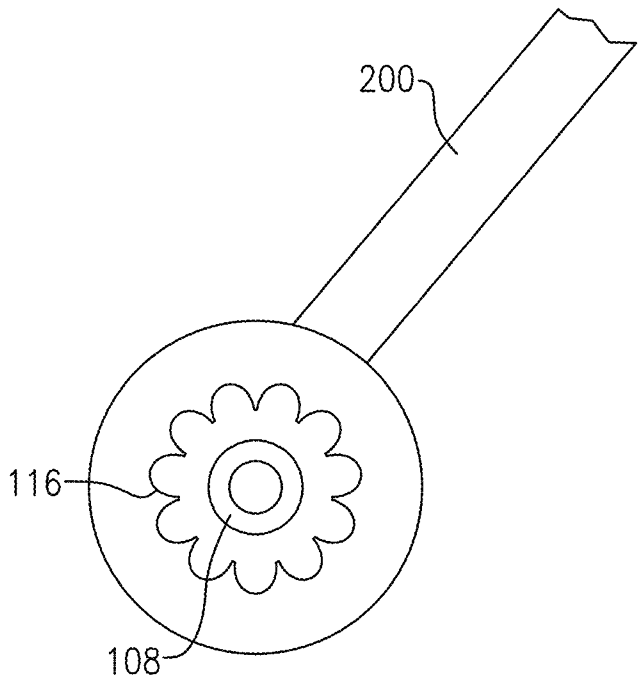
FIG. 6 shows a method of mounting or removing a tube.

Referring to FIG. 4, in an implementation the tube 80 is rotated about a central longitudinal axis D of the cavity 82 (shown in FIGS. 3A and 3B) until the tube 80 is securely seated within the cavity 82. Specifically, an operator may engage the grooved neck 108 of the tube 80 with a standard tooling device 200 (see FIG. 6), such as a socket wrench, and torque the tube 80 down into its seated position within the cavity 82. The operator may also use the standard tooling device 200 to remove the tube 80 from the cavity 82 by turning the tube 80 in a reverse direction.

The collar 105 includes a body 113 with a first surface 121 and a second surface 123 opposite to the first surface 121. The first surface 121 of the collar 105 is adapted to abut an outer surface 124 of the outer case 86 and be flush with the outer surface 124 when the collar 105 is in a seated position (e.g., receiving the first end 96 of the tube 80 therethrough and bolted to the outer case 86).

The plate 104 includes a body 119 with a first surface 125 and a second surface 126 opposite the first surface 125. The first surface 125 of the plate 104 is adapted to abut the second surface 123 of the collar 105 and to be flush with the second surface 123 of the collar 105 when the plate 104 is in a seated position (e.g., positioned on top of the collar 105, receiving the first end 96 of the tube 80, and bolted to the outer case 86).

The collar 105 includes a stem 128 extending orthogonally outwards from the first surface 121. The stem 128 partially defines an aperture 129 that serves as an inner passage of the collar 105. The aperture 129 extends through a body 131 of the collar 105 from an opening in the second surface 123 to an opposing opening at the end of the stem 128.

The aperture 129 is adapted to receive the first end 96 of the tube 80 therethrough. An inner wall 132 of the stem 128 complements the first end 96 of the tube 80 and is configured to engage the first end 96, thereby preventing rotation of the tube 80 relative to the outer case 86 and cavity 82. The inner wall 132 includes a tabbed ring 134 that extends circumferentially around an entire circumference of a portion of the aperture 129 and protrudes outward from the inner wall 132. When both the tube 80 and collar 105 are in their respective seated position, the tabbed ring 134 engages the first end 96. Specifically, the tabbed ring 134 may be adapted to crimp between the protruding portion 118 and first edge 115. However, other designs for the complementary surface are within the scope of this disclosure.

The plate 104 includes a first bore 130 that extends through the body 119 of the plate 104 from the first surface 125 of the plate 104 to the second surface 126 of the plate 104. The first bore 130 is adapted to align with the aperture 129 when both the plate 104 and collar 105 are in a seated position. Accordingly, the tube 80 is adapted to be received by both the aperture 129 and the first bore 130.

The chamber 103 is shown communicating lubricant from the tube 80 to a downstream location.

Figure 5:
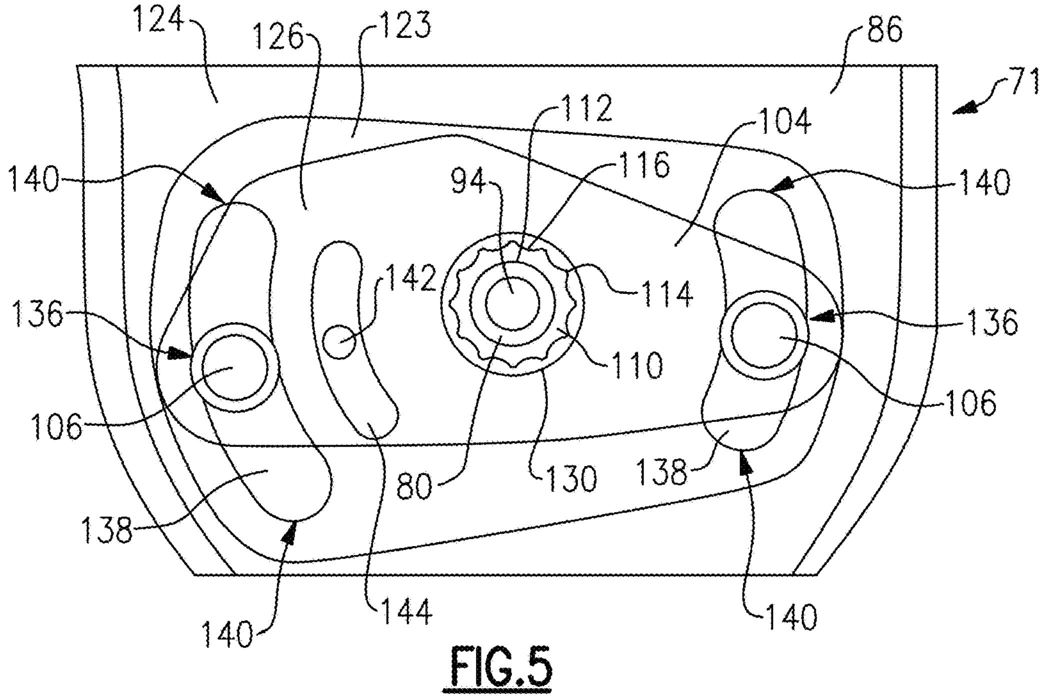
FIG. 5 shows a top, cross-sectional view of the collar and retention plate placed over the first end of the tube of FIG. 3C.

Referring to FIG. 5, the plate 104 includes two other bores 136 adapted to receive a bolt 106 therethrough. The bores 136 extend through the body 119 of the plate 104 from the first surface 125 to the second surface 126 of the plate 104. The two bores 136 are positioned on opposite sides of the first bore 130 from each other.

The collar 105 includes two slots 138 adapted to receive a bolt 106 therethrough. The slots 138 extend through the body 113 of the collar 105 from the first surface 121 to the second surface 123 of the collar 105. The two slots 138 are positioned on opposite sides of the aperture 129.

The two slots 138 are adapted to align with the two bores 136, respectively, when the plate 104 and collar 105 are in their respective seated positions. Thus, each pair of slots 138 and bores 136 are adapted to receive a single bolt 106 therethrough. Each of the slots 138 are an elongated, crescent shape with curved opposing ends 140. The slots 138 curve inward towards the aperture 129, and this shape of the slots 138 allows for rotation of the collar 105 while it is being bolted down to the outer case 86. Specifically, the shape of the slots 138 allow the operator to torque down the plate 104, ensuring the first surface 125 of the plate 104 sits flush with the second surface 123 of the collar 105 without causing the plate 104 to bind.

In the implementation shown in FIG. 5, only two bolts 106 are required to anchor the collar 105 and plate 104 to the outer case 86.

The plate 104 includes an alignment pin 142 that extends outwardly from the first surface 125 of the plate 104. The pin 142 is adapted to align with an alignment slot 144 of the collar 105. The alignment slot 144 is a cavity that extends from the second surface 123 of the collar 105 through the first surface 121. When the collar 105 and plate 104 are in their respective seated positions, the pin 142 is adapted to be received within the alignment slot 144. This feature ensures that an operator does not incorrectly install the collar 105 and plate 104 to the outer case 86. For example, if an operator attempts to install the plate 104 before installing the collar 105, the pin 142 will contact the outer surface 124 of the outer case 86 and prevent the plate's 104 first surface 125 from being flush with the outer surface 124 of the outer case 86.

A method for installing a tube 80 within the static housing 71 of the mid-turbine frame 57 may include any of the techniques disclosed herein. The method may include inserting the second end 98 of the tube 80 into the cavity 82 of the static housing 71 such that the threaded portion 120 engages a complementary surface along walls of the cavity 82, such as grooves. Using a standard tooling device 200, such as a socket wrench, an operator may apply rotational torque to the grooved neck 108 at the first end 96 of the tube 80 to advance the second end 98 along the complementary surface of the cavity 82 and draw the tube 80 into the cavity 82 until the tube 80 reaches a seated position within the cavity 82. The collar 105 is installed over the first end 96 of the tube 80. Specifically, the collar 105 is positioned such that the first surface 121 of the collar 105 abuts the outer surface 124 of the outer case 86. The aperture 129 receives the first end 96 of the tube 80 therethrough and the tabbed ring 134 engages the first end 96 of the tube 80. The plate 104 is installed on top of the collar 105. Specifically, the plate 104 is positioned on top of the collar 105 such that the first surface 125 of the plate 104 abuts the second surface 123 of the collar 105. The first end 96 of the tube 80 is received within the first bore 130 of the plate 104. Accordingly, the first bore 130 is aligned with the aperture 129, each bore 136 is aligned with its respective slot 138, and the pin 142 is received by the alignment slot 144. The plate 104 and collar 105 are bolted to the outer case 86 to prevent rotation of the tube 80 relative to the static housing 71. On the other hand, one removes the collar 105 and plate 104 and then torques the tube 80 in a reverse direction to remove and replace the tube 80.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of installing a tube within a static housing of a mid-turbine frame of a gas turbine engine, comprising:
- inserting a second end of the tube into a cavity of the static housing such that threads of the second end engage a complementary surface along walls of the cavity;
- applying rotational torque in a first, rotational direction to a grooved neck at a first end of the tube, opposite the second end, the grooved neck including a plurality of grooves on an outer circumferential surface of the grooved neck, to advance the second end along the complementary surface and draw the tube into the cavity until the tube reaches a seated position within the cavity;
- then installing a collar over the first end of the tube;
- installing a retention plate on the collar; and
- bolting the retention plate and collar to the static housing to prevent rotation of the tube relative to the static housing.

2. The method of claim 1, wherein the collar includes an aperture and first and second slots extending through a body of the collar from a first surface of the collar to a second surface of the collar.

3. The method of claim 2, wherein the retention plate includes first, second and third bores extending through a body of the retention plate from a first surface of the retention plate to a second surface of the retention plate.

4. The method of claim 3, wherein the step of installing the collar over the first end of the tube further includes positioning the collar on the static housing such that the first surface of the collar abuts the static housing, the aperture receives the first end of the tube therethrough and an engagement surface of the aperture engages the first end of the tube.

5. The method of claim 4, wherein the step of installing the retention plate on the collar includes positioning the retention plate on the collar such that the first surface of the retention plate abuts the second surface of the collar, and the aperture, first slot, and second slot align with the first, second and third bores of the retention plate, respectively, and the first bore receives the first end of the tube partially therethrough.

6. The method of claim 5, wherein the step of bolting the retention plate and collar to the static housing further includes:
- driving a first bolt through the second bore and first slot into the static housing, and driving a second bolt through the third bore and second slot into the static housing.

7. The method of claim 6, further including a deinstallation step comprising:
- removing each of the bolts, the retention plate, and the collar; and
- applying rotational torque to the grooved neck in a second rotational direction that is opposite to the first rotational direction until the tube is no longer in the seated position.

8. The method of claim 3, wherein the retention plate includes a pin extending outward from the first surface of the retention plate, and the collar includes a third slot configured to receive the pin.

9. The method of claim 2, wherein the first and second slots are positioned at opposite sides of the aperture and are an elongated, crescent shape with curved opposing ends to allow adjustment.

10. The method of claim 2, wherein the collar includes a stem configured to be received within the static housing extending orthogonally outwards from the first surface of the collar, and the stem partially defines the aperture which serves as an inner passage of the collar.

11. The method of claim 1, wherein the step of applying rotational torque to the grooved neck further includes using a socket wrench to apply the rotational torque.

12. The method of claim 1, wherein the static housing defines a bearing compartment, the bearing compartment including at least one bearing, and the bearing compartment is bound by a lubricant seal assembly adjacent to the static housing.

13. The method of claim 12, wherein the tube is positioned on an opposite side of the lubricant seal assembly from the at least one bearing and the second end opens to a discharge line of the bearing compartment.

14. The method of claim 13, wherein the tube is configured to convey fluid from the second end to the first end.

15. A method of installing a tube within a static housing of a mid-turbine frame of a gas turbine engine, comprising:

inserting a second end of the tube into a cavity of the static housing such that threads of the second end engage a complementary surface along walls of the cavity, wherein the collar includes an aperture and first and second slots extending through a body of the collar from a first surface of the collar to a second surface of the collar, a retention plate includes first, second and third bores extending through a body of the retention plate from a first surface of the retention plate to a second surface of the retention plate and a pin extending outward from the first surface of the retention plate, and the collar further includes a third slot configured to receive the pin;

applying rotational torque in a first, rotational direction to a grooved neck at a first end of the tube, opposite the second end, the grooved neck including a plurality of grooves on an outer circumferential surface of the grooved neck, to advance the second end along the complementary surface and draw the tube into the cavity until the tube reaches a seated position within the cavity;

installing a collar over the first end of the tube; installing the retention plate on the collar; and bolting the retention plate and collar to the static housing to prevent rotation of the tube relative to the static housing.

16. The method of claim 15, wherein the step of installing the collar over the first end of the tube further includes positioning the collar on the static housing such that the first surface of the collar abuts the static housing, the aperture receives the first end of the tube therethrough and an engagement surface of the aperture engages the first end of the tube.

17. The method of claim 16, wherein the step of installing the retention plate on the collar includes positioning the retention plate on the collar such that the first surface of the retention plate abuts the second surface of the collar, and the aperture, first slot, and second slot align with the first, second and third bores of the retention plate, respectively, and the first bore receives the first end of the tube partially therethrough.

* * * * *